US007693773B2

(12) United States Patent
Hockley et al.

(10) Patent No.: US 7,693,773 B2
(45) Date of Patent: Apr. 6, 2010

(54) INTERACTIVE USER INTERFACE FOR DISPLAYING INFORMATION RELATED TO PUBLICLY TRADED SECURITIES

(75) Inventors: Richard Hockley, New York, NY (US); Brendan Scholey, London (GB)

(73) Assignee: Morgan Stanley, New York, NY (US)

( * ) Notice: Subject to any disclaimer, the term of this patent is extended or adjusted under 35 U.S.C. 154(b) by 49 days.

(21) Appl. No.: 11/580,468

(22) Filed: Oct. 13, 2006

(65) Prior Publication Data
US 2008/0215496 A1 Sep. 4, 2008

(51) Int. Cl.
*G06Q 40/00* (2006.01)
(52) U.S. Cl. .................................. 705/36 R
(58) Field of Classification Search ............... 705/36 R
See application file for complete search history.

(56) References Cited

U.S. PATENT DOCUMENTS

| 7,349,877 | B2* | 3/2008 | Ballow et al. .......... 705/36 R |
| 2002/0055899 | A1 | 5/2002 | Williams |
| 2002/0178105 | A1 | 11/2002 | Levine |
| 2003/0083974 | A1 | 5/2003 | Bunda |
| 2004/0117219 | A1* | 6/2004 | Sugimoto et al. ............ 705/5 |
| 2004/0220868 | A1 | 11/2004 | Dainoff et al. |
| 2005/0171881 | A1* | 8/2005 | Ghassemieh et al. ......... 705/35 |
| 2005/0209946 | A1* | 9/2005 | Ballow et al. ............ 705/35 |
| 2005/0216861 | A1 | 9/2005 | Hurewitz et al. |
| 2005/0246255 | A1* | 11/2005 | Rousseau et al. .......... 705/35 |
| 2005/0246257 | A1 | 11/2005 | Zhang |
| 2005/0261999 | A1 | 11/2005 | Rowady, Jr. |
| 2006/0059065 | A1 | 3/2006 | Glinberg et al. |
| 2006/0195799 | A1 | 8/2006 | Sawyer |

* cited by examiner

*Primary Examiner*—Charles R Kyle
*Assistant Examiner*—David L Wood
(74) *Attorney, Agent, or Firm*—K&L Gates LLP

(57) ABSTRACT

An interactive user interface for displaying information about a plurality of publicly traded securities (e.g., stocks) at one time is disclosed. According to various embodiments, the interface may comprise (i) a two-dimensional chart comprising an x-axis and a y-axis, (ii) a first field for specifying a first metric related to the publicly traded securities for the x-axis, and (iii) a second field for specifying a second metric related to the publicly traded securities for the y-axis. An icon (e.g., a circle or a bubble) may be positioned on the chart at the x and y coordinates for each of the publicly traded companies based on the selected x-axis and y-axis metrics. In addition, the size of the icons may be representative of a third metric related to the publicly traded securities such as, for example, the market capitalization of the companies that issued the securities. Also, an interior feature of the icons (e.g., the color or hatching) may be representative of a fourth metric related to the publicly traded securities, such as the rating for the securities.

Figure 1:
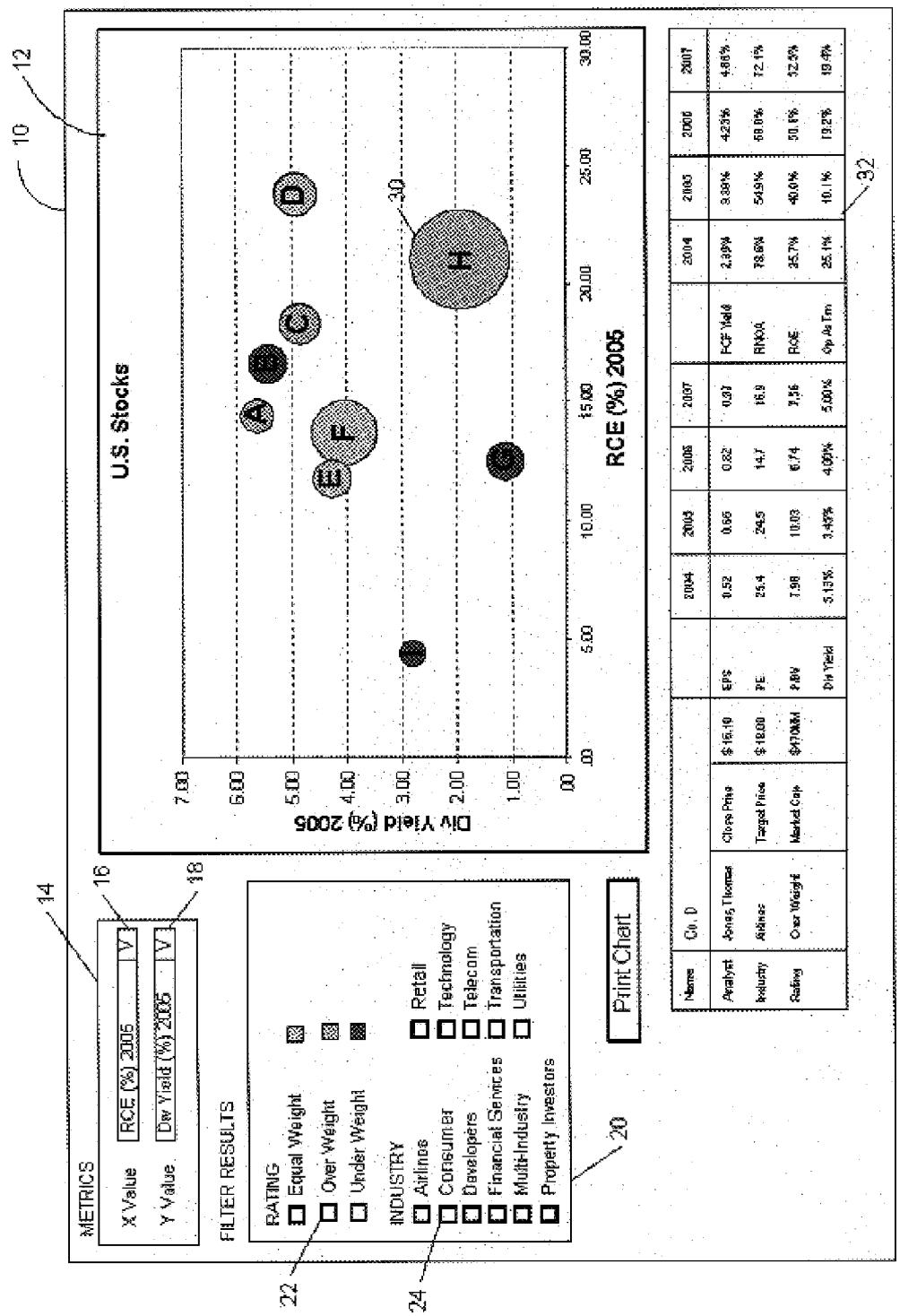

13 Claims, 3 Drawing Sheets
(1 of 3 Drawing Sheet(s) Filed in Color)

INTERACTIVE USER INTERFACE FOR DISPLAYING INFORMATION RELATED TO PUBLICLY TRADED SECURITIES

STATEMENT REGARDING COLOR DRAWINGS

This patent or application file contains at least one drawing executed in color. Copies of this patent or patent application publication with color drawing(s) will be provided by the Office upon request and payment of the necessary fee.

BACKGROUND

There are numerous parameters that provide financial information about publicly traded securities (e.g., stocks). These parameters include, for example, the market capitalization of the company that issued the security, the security's performance rating, the company's geographic region and industry sector, the exchange on which the security is traded, the price-to-earnings ratio (P/E), the company's growth rate, the security appreciation (or depreciation) rate over various time periods (e.g., 1 year, 3 years, 5 years), etc. This is only a small sample of the parameters that are sometimes used to assess a publicly traded security. Numerous other parameters exist, including ones that are the result of mathematical formulas based on one or more underlying parameters.

An analyst of publicly traded securities considers many of these parameters for a number of securities. The ability of analysts to visualize multiple parameters for numerous companies at a time in a meaningful way, however, is limited. The analyst could use a table containing the data, but such tables are often hard to interpret and do not lend themselves to easy visual analysis and inspection. Also, simple charts, such as bar charts and scatter charts, are often not satisfactory because they can only convey information about one or two parameters at a time.

Accordingly, there exists a need for a way to visually present data on numerous parameters for numerous securities at a time in a meaningful way.

SUMMARY

In one general aspect, the present invention is directed to an interactive user interface for displaying information about a plurality of publicly traded securities (e.g., stocks) at one time. According to various embodiments, the interface may comprise (i) a two-dimensional chart comprising an x-axis and a y-axis, (ii) a first field for specifying a first metric related to the publicly traded securities for the x-axis, and (iii) a second field for specifying a second metric related to the publicly traded securities for the y-axis. An icon (e.g., a circle or a bubble) may be positioned on the chart at the (x, y) coordinates for each of the publicly traded companies based on the selected x-axis and y-axis metrics. In addition, the size of the icons may be representative of a third metric related to the publicly traded securities such as, for example, the market capitalization of the companies that issued the securities. Also, an interior feature of the icons (e.g., the color or hatching) may be representative of a fourth metric related to the publicly traded securities, such as the rating for the securities.

According to various implementations, the user interface may also comprise a filter field where a user can select one or more filters for filtering the publicly traded securities displayed on the chart. The filters may include, for example, industry-based filters and/or rating-based filters. In addition, the interface may comprise an information field for displaying information about a selected one of the publicly traded securities when the icon in the chart corresponding to the selected one of the publicly traded securities is activated by a user.

The interface may be interactive in the sense that a user may change the filter selections and the chart 12 may be updated in real time (or near real time) based on the revised filter selections. Also, the interface may be interactive in the sense that the user could change the metrics for the x and/or y axes, and the chart 12 may display the updated results based on the new metric(s) in real time. Further, the interface may be interactive in the sense that the user could activate different icons on the chart to change the information displayed in the information field that display information specific to the user-selected icon.

In other general aspects, the present invention is directed to related systems and methods for displaying the user interface.

FIGURES

Figure 2:
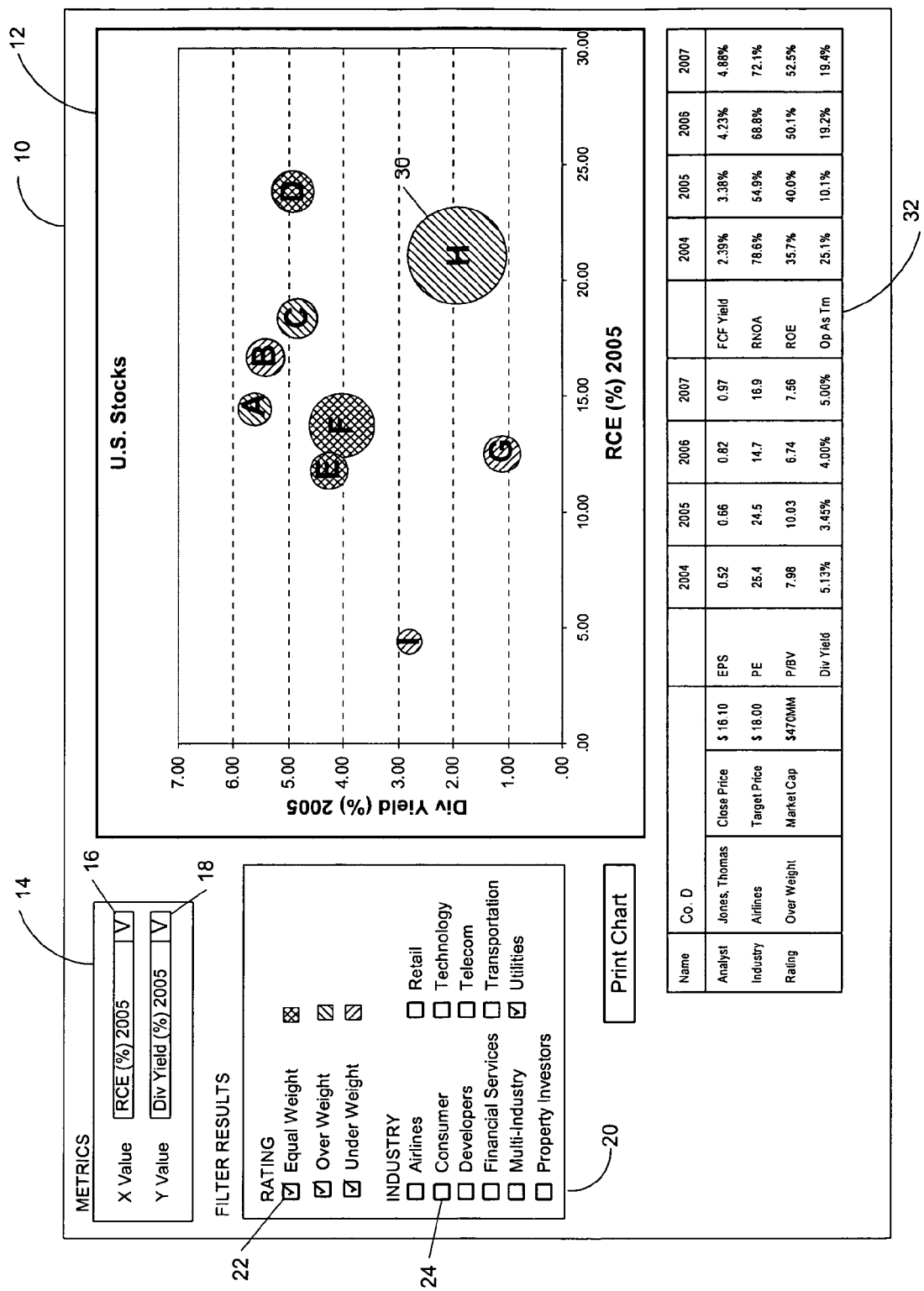
Figure 3:
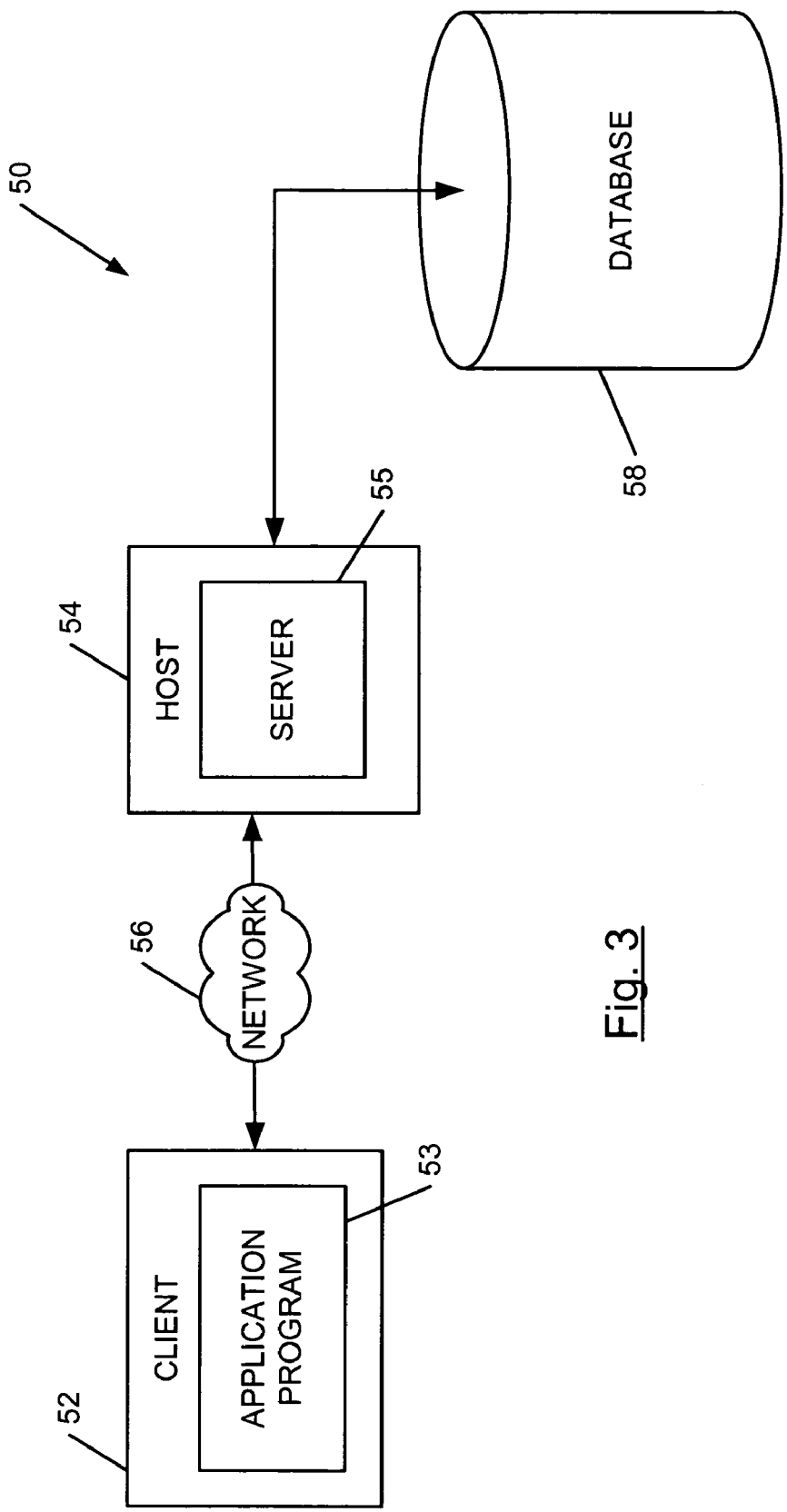

Various embodiments of the present invention are described herein by way of example in conjunction with the following figures, wherein:

FIGS. 1 and 2 illustrate a user interface for displaying information about publicly traded securities at one time according to various embodiments of the present invention; and FIG. 3 is a diagram of a system according to various embodiments of the present invention.

DETAILED DESCRIPTION

FIG. 1 is a diagram of an interactive user interface 10 according to various embodiments of the present invention. The interface 10 may visually display information about multiple financially related parameters or metrics for multiple publicly traded securities (e.g., stocks) at a time in a chart 12 such that the user may quickly and perspicuously assimilate the information. Also, the interface 10 may be interactive, allowing the user to change, for example, the parameters and/or securities displayed on the chart 12 to gain a different or enhanced perspective. A user may be presented with the interface 10 using a computer-based system as described further below in connection with FIG. 3.

As shown in the illustrated embodiment, the interface 10 may include a first field 14 where the user may select the financial metrics for the x and y axes of the chart 12. According to various embodiments, the user may select the metric for the x-axis using a drop-down window 16 that is populated with available metrics. Similarly, the user may select the metric for the y-axis using a drop-down window 18 that is populated with the available metrics. According to various embodiments, the available metrics for the x and/or y axes may include (but are not limited to): dividend yield (%); free cash flow (FCF) yield ratio (%); return on net operating assets (RNOA) (%); return on equity (%); price-to-book value (P/BV); price-to-earning ratio (P/E); earnings per share (eps) change (%); pretax operating (PTOP) profit margin (%); capital expenditures; depreciation, in income statement; net debt; free cash flow (FCF) from operations; plant, property, and equipment (PPE) net; total assets; PPE to assets (%); dividend payout ratio (%); operating asset turnover; net income to sales (%); change in depreciation (%); net interest cover; sales growth (%); price change (%); average trade volume; average value traded; percentage of analysts with buy, sell or hold ratings; cost of equity; and beta (i.e., a quantitative measure of volatility of a stock). This listing is only a representative sample of the possible metrics that may be used. In other embodiments, other and/or additional financial metrics may be used. Also, the user may select the desired year for the selected metric. For future years, the value for the metric may be an estimated value. In addition, for some metrics, such as price change, average trade volume, average value traded, the drop-down menus 16, 18 may allow the user to select various time periods over which these metrics are measured (e.g., last 5 trading days, last 1 month, last 3 months, last 6 months, last year, etc.).

In a second field 20, the user may select various filters to apply to the displayed results. For example, the user may select using check boxes 22 the performance ratings of the securities to be displayed in the chart 12. The check boxes 22 may be activated/deactivated by clicking on the box with a mouse pointer or some other pointer device. The user may select one, some, or all of the possible ratings.

As shown in the illustrated embodiment, the performance ratings may be equal weight, overweight, and underweight. An overweight rating may indicate that a security is expected to outperform a relevant benchmark for the security; an equal weight rating may indicate that a security is expected to perform at or around the relevant benchmark; and an underweight rating may indicate that a security is expected to perform below the relevant benchmark. In other embodiments, different ratings may be used, such as buy, sell, or hold.

Also in field 20 the user may select the desired industry sectors for the securities to be displayed in the chart 12 using check boxes 24. As shown in the example of FIG. 1, the industry sectors may include: airlines; consumer goods; developers; financial services; multi-industry; property developers; retail; technology; telecommunications; transportation; and utilities. The user may select one, some, or all of the possible industry sectors using the appropriate check boxes 24. In other embodiments, different and/or additional industry sector designations may be used. Examples of other industry sector designations include but are not limited to: aerospace and defense; biotechnology; pharmaceuticals; insurance; media; and software.

In other embodiments, the user may select the geographic region(s) for the securities to be displayed in the chart 12. In some embodiments, this selection may be done at a user interface presented to the user prior to the interface shown in FIG. 1. Or, in other embodiments unlike the example shown in FIG. 1, there could be a field in the interface 10 that allows the user to select the desired geographic region(s). The geographic region(s) may include, for example: the United States; Australia; Hong Kong; Singapore; New Zealand; Japan; Great Britain; the EU; the EU without the UK; and Canada. In the example shown in FIG. 1, the user selected U.S. stocks. In addition, in some embodiments the user may also be able to select the exchanges (e.g., New York Stock Exchange, NASDAQ, etc.) on which the securities to be displayed are traded.

The results of the user selections in fields 14, 20 may be displayed in the chart 12. The metric for the x-axis for the chart 12 may correspond to the metric selected from drop-down menu 16, and the metric for the y-axis may correspond to the metric selected from drop-down menu 18. A circle 30 may be placed at the corresponding coordinate on the chart 12 based on the selected x and y axis metrics for each security that is displayed on the chart 12 (e.g., each security that satisfies the applicable filters). Each circle 30 may be labeled in a way that identifies the corresponding security. In the preferred embodiment, the circles 30 are labeled with the ticker symbol for the traded security. Ticker symbols typically comprise one or more alphanumeric characters. In the illustrated embodiment, the circles 30 are labeled with a single letter (A to I) for the sake of convenience.

Also, in various embodiments, an interior feature of the icons may be representative of another metric related to the displayed securities. For example, the color of the circles 30 may correspond to the rating for the security as shown in the field 20, as shown in FIG. 1. That is, for example, the circles 30 corresponding to equal weighted securities may have a first color (green in the illustrated embodiment); the circles 30 corresponding to overweight securities may have a second color (teal in the illustrated embodiment); and the circles 30 corresponding to underweight securities may have a third color (magenta in the illustrated embodiment).

In other embodiments, different interior features for the circles 30 may be used to represent the rating of the represented security. For example, as shown in FIG. 2, different cross-hatching schemes can be used to designate the ratings of the represented securities. In this illustrated embodiment, equal weighted securities are denoted with a cross hatch, the overweight securities are denoted with a forward slash (i.e., solidus) hatch, and the underweight securities are denoted with a back slash (i.e., reverse solidus) hatch.

Further, in various embodiments, the size of the circle 30 may represent the market capitalization of the company that issued the security. For example, the larger the circle, the greater the market capitalization of the company. In the illustrated example, therefore, the user could quickly discern that Company H has a much larger market capitalization than Company A. The user could also discern that Companies A, B, and C have comparable market capitalizations in the illustrated example. There may also be a linear relationship between the market capitalization and a parameter of the circle (e.g., area, diameter, circumference, and radius).

The interface 10 may also, according to various embodiments, comprise a field 30 listing, in tabular form, information about one of the companies whose securities are represented in the chart 12. The user may click on or otherwise activate (e.g., a mouseover) one of the circles 30 in chart 12 to display information about the corresponding company in the field 30. That way, a user may quickly review relevant information about each of the securities represented in the chart 12 by clicking on some or all of the circles 30 in sequence.

According to various embodiments, the field 32 may list various data and financial metrics about the selected security. For example, the field 32 may identify the name of the company, an analyst (or analysts) who covers the security, the company's industry, and the current rating given to the security by the analyst. The field may also display, as shown in the example of FIG. 1, other information about the corresponding security, such as the closing price on the previous trading day, the target price for the security assigned by the analyst, and the market capitalization of the company. Additionally, the field 30 may disclose fundamental metrics about the company, including, for example: earnings per share (EPS); price-to-earnings ratio (PE); price-to-book value (P/BV); dividend yield; free cash flow (FCF) yield; return on net operating assets (RNOA); return on equity (ROE); and operating asset turnover. The information displayed in the field 32 in FIG. 1 is exemplary. According to other embodiments, different and/or additional information may be displayed.

In other embodiments, other icons besides circles, such as other geometric shapes, may be used in the chart 12 to represent the securities.

According to various embodiments, the interface 10 may be interactive in the sense that a user may change the filter selections in the field 20 and the chart 12 may be updated in real time or near real time based on the revised filter selections. The interface 10 may also be interactive in the sense that the user could change the metrics for the x and/or y axes, and the chart 12 may display the updated results based on the new metric(s) in real time or near real time. Further, the interface 10 may be interactive in the sense that the user could activate different circles 30 in the chart 12 to change the information displayed in the field 30 in real time or near real time.

FIG. 3 is a diagram of a system 50 for presenting the interface 10 to a user according to various embodiments. The user may view the interface 10 at a client device 52, which may include an application program 53, such as a web browser, for displaying the interface 10. The client device 52 may be any type of device capable of receiving, rendering and displaying the interface 10 such as, for example, a portable computer (PC), a laptop computer, a workstation, a web-enabled telephone, etc. The interactive user interface 10 may be, for example, part of a web page or other document that is served to the client device 52 from a host computing device 54 (referred to hereinafter as the "host") through a network 56. The host 54, which is shown as a single device in FIG. 2 but which may be embodied as a series of networked computing devices, may include a server 55 for generating the web pages or documents comprising the interface 10 based on data stored in one or more databases 58. The server 55 may serve the generated web pages or documents via the network 56 to the client device 52. In that way, the interface 10 may be displayed to the user in real time or near real time.

According to various embodiments, the database(s) 58 may include the data necessary to generate the chart 12. The data in the database(s) 58 may be based on, for example, data feeds from sources and/or analyst models used to model the securities of publicly traded companies.

Various embodiments of the present invention are also directed to methods of presenting information to a user (e.g., an analyst) about a plurality of publicly traded securities at one time in an interactive user interface. The method may comprise displaying a user interface to the user where the user interface comprises: (a) a two-dimensional chart comprising an x-axis and a y-axis; (b) a first field for specifying a first metric related to the publicly traded securities for the x-axis; and (c) a second field for specifying a second metric related to the publicly traded securities for the y-axis. An icon may be positioned on the chart at the x and y coordinates for each of the publicly traded companies, and the size of the icons may be representative of a third metric related to the publicly traded securities, such as market capitalization. In addition, an interior feature of the icons may be representative of a fourth metric related to the publicly traded securities, such as the rating for the securities. The user interface may further comprise a third field for displaying information about a selected one of the publicly traded securities when the icon in the chart corresponding to the selected one of the publicly traded securities is activated by a user.

While several embodiments of the present invention have been described herein, it should be apparent that various modifications, alterations and adaptations to those embodiments may occur to persons skilled in the art. It is therefore intended to cover all such modifications, alterations and adaptations without departing from the scope and spirit of the present invention as defined by the appended claims.

What is claimed is:

1. A system for providing an interactive user interface to a user comprising:
   a remote computer device in communication with a computer network, the remote computer device comprising an application program for displaying the interactive user interface, the interactive user interface displaying information about a plurality of publicly traded securities at one time; and
   a computer server in communication with the remote computer device via the computer network, wherein the computer server is for serving a file for the interactive user interface via the computer network to the remote computer device, the interactive user interface comprising:
      a two-dimensional chart comprising an x-axis and a y-axis;
      a first interactive field for allowing a user of the remote computer device to select a first metric related to the publicly traded securities for the x-axis from a defined set of financial metrics;
      a second interactive field for allowing the user of the remote computer device to select a second metric related to the publicly traded securities for the y-axis from the defined set of financial metrics, wherein the defined set of financial metrics comprises a return on net operating assets (RNOA) metric, a return on equity (ROE) metric and a price-to-earnings ratio (P/E) metric, wherein an icon is positioned on the chart at the x and y coordinates for each of the plurality of publicly traded securities based on the selected metrics, and wherein the size of the icons is representative of a third metric related to the publicly traded securities;
      a filter field for allowing the user of the remote computer device to select from a plurality of filters to be applied to a group of publicly traded securities to select the plurality of publicly traded securities to be represented on the two-dimensional chart, wherein the plurality of filters comprises at least one filter for based on projected stock performance ratings of the securities, at least one filter based on industries of the securities and at least one filter based on geographic locations of issuers of the securities; and
      a tabular information field populated when the user of the remote computer device selects an icon of one of the plurality of publicly traded securities, wherein the tabular information field comprises values for a plurality of metrics describing the security corresponding to the selected icon and wherein the plurality of metrics comprises a return on net operating assets (RNOA) metric, a return on equity (ROE) metric and a price-to-earnings ratio (P/E) metric, an indication of an analyst following the security, a target price of the security and a projected stock performance rating of the security such that the two-dimensional chart, the first and second interactive fields, the filter field and the tabular information field are displayed by the user interface simultaneously.

2. The system of claim 1, wherein the size of the icons is representative of the market capitalization of the companies that issued the publicly traded securities.

3. The system of claim 2, wherein an interior feature of the icons is representative of a fourth metric selected by the user of the remote computer device related to the publicly traded securities.

4. The system of claim 3, wherein the interior feature of the icons is representative of a rating for the publicly traded securities.

5. The system of claim 4, wherein the interior feature is a color code representative of the rating for the publicly traded securities.

6. The system of claim 1, wherein:
   the first interactive field for allowing the user of the remote computer device to select the first metric for the x-axis comprises a first drop-down menu; and the second interactive field for allowing the user of the remote computer device to select the second metric for the y-axis comprises a second drop-down menu.

7. The system of claim 6, wherein the first drop-down menu includes a plurality of metrics selected from the group consisting of: dividend yield, free cash flow yield ratio, return on net operating assets, return on equity, price-to-book value, price-to-earnings ratio, earnings per share change, pretax operating profit margin, capital expenditures, depreciation, net debt, free cash flow from operations, PPE (plant, property and equipment) to assets ratio, dividend payout ratio, operating asset turnover, net income to sales ratio, change in depreciation, net interest cover, sales growth, price change, average trade volume, average value traded, cost of equity, and beta.

8. A method of presenting information about a plurality of publicly traded securities at one time comprising:
displaying a user interface by a remote electronic computer device, wherein the user interface comprises:
a two-dimensional chart comprising an x-axis and a y-axis;
a first interactive field for allowing a user of the remote computer device to select a first metric related to the publicly traded securities for the x-axis from a defined set of financial metrics;
a second interactive field for allowing the user of the remote computer device to select a second metric related to the publicly traded securities for the y-axis from the defined set of financial metrics, wherein the defined set of financial metrics comprises a return on net operating assets (RNOA) metric, a return on equity (ROE) metric and a price-to-earnings ratio (P/E) metric; and
a filter field for allowing the user of the remote computer device to select from a plurality of filters to be applied to a group of publicly traded securities to select the plurality of publicly traded securities to be represented on the two-dimensional chart, wherein the plurality of filters comprises at least one filter based on projected stock performance ratings of the securities, at least one filter based on industries of the securities and at least one filter based on geographic locations of issuers of the securities;
receiving, at a host computer server in communication with the remote computer device via a computer network, the first and second metrics and at least one filter selected by the user;
selecting the plurality of publicly traded securities by applying the at least one filter to the group of publicly traded securities;
retrieving, by the host computer server from a computer database, values for the first and second metrics for the plurality of publicly traded securities; and
displaying, by the remote computer device, an icon on the chart at the x and y coordinates for each of the publicly traded securities, wherein the x coordinate is related to the value of the first metric and the y coordinate is related to the value of the second metric, and wherein the size of the icons is representative of a third metric related to the publicly traded securities, wherein the remote computer device is programmed to display the interface based on communications received from the host computer service via the data network; and
displaying, by the remote computer device, a tabular information field populated when the user of the remote computer device selects an icon of one of the plurality of publicly traded securities, wherein the tabular information field comprises values for a plurality of metrics describing the security corresponding to the selected icon and wherein the plurality of metrics comprises a return on net operating assets (RNOA) metric, a return on equity (ROE) metric and a price-to-earnings ratio (P/E) metric, an indication of an analyst following the security, a target price of the security and a projected stock performance rating of the security such that the two-dimensional chart, the first and second interactive fields, the filter field and the tabular information field are displayed by the user interface simultaneously.

9. The method of claim 8, wherein the size of the icons is representative of the market capitalization of the companies that issued the publicly traded securities.

10. The method of claim 9, wherein an interior feature of the icons is representative of a fourth metric selected by the user of the remote computer device related to the publicly traded securities.

11. The method of claim 8, wherein the interior feature of the icons is representative of a rating for the publicly traded securities.

12. The method of claim 11, wherein the interior feature is a color code representative of the rating for the publicly traded securities.

13. The method of claim 11, wherein:
the first interactive field for allowing the user of the remote computer device to select the first metric for the x-axis comprises a first drop-down menu; and
the second interactive field for allowing the user of the remote computer device to select the second metric for the y-axis comprises a second drop-down menu.

* * * * *